United States Patent
Kim et al.

(10) Patent No.: US 11,962,648 B2
(45) Date of Patent: Apr. 16, 2024

(54) MOBILE TERMINAL THAT EXECUTES APPLICATION LOCALLY WHEN DISCONNECTED FROM CLOUD SERVER

(71) Applicant: LG ELECTRONICS INC., Seoul (KR)

(72) Inventors: Bokyum Kim, Seoul (KR); Seunghwan Roh, Seoul (KR); Sungkyoung Kim, Seoul (KR); Hyungrok Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 142 days.

(21) Appl. No.: 17/617,141

(22) PCT Filed: Feb. 12, 2020

(86) PCT No.: PCT/KR2020/001972
§ 371 (c)(1),
(2) Date: Dec. 7, 2021

(87) PCT Pub. No.: WO2021/162141
PCT Pub. Date: Aug. 19, 2021

(65) Prior Publication Data
US 2022/0239738 A1    Jul. 28, 2022

(51) Int. Cl.
G06F 15/16       (2006.01)
G06F 8/65        (2018.01)
H04L 67/1095     (2022.01)

(52) U.S. Cl.
CPC ............ *H04L 67/1095* (2013.01); *G06F 8/65* (2013.01)

(58) Field of Classification Search
CPC ... H04L 67/1095; H04L 67/01; H04L 67/025; H04L 67/04; G06F 8/65
USPC .................. 709/219, 203, 217, 248
See application file for complete search history.

(56) References Cited

U.S. PATENT DOCUMENTS

| 9,621,627 | B2 * | 4/2017 | Elias ...................... G06F 9/445 |
| 11,190,587 | B1 * | 11/2021 | Burnett ............... H04L 67/1095 |
| 2002/0135797 | A1 * | 9/2002 | Al-Kazily ............. G06F 3/1292 |
| | | | 358/1.15 |
| 2008/0147422 | A1 * | 6/2008 | Van Buskirk ...... G06Q 10/0631 |
| | | | 705/7.12 |

(Continued)

FOREIGN PATENT DOCUMENTS

| KR | 10-2005-0031018 A | 4/2005 |
| KR | 10-2006-0108557 A | 10/2006 |

(Continued)

*Primary Examiner* — Kaylee J Huang
(74) *Attorney, Agent, or Firm* — Birch, Stewart, Kolasch & Birch, LLP

(57) ABSTRACT

Discussed is a a mobile terminal including a communication device to communicate with a cloud server, a display to output an execution screen of an application, a local memory to store data, and a processor to control the communication device, the display, and the local memory. The processor can synchronize data of the application executed on the cloud server and store the synchronized data in the local memory when connected to the cloud server. Further, the processor can continuously execute the application locally at the mobile terminal using the synchronized data of the application when disconnected from the cloud server.

22 Claims, 10 Drawing Sheets

(56) References Cited

U.S. PATENT DOCUMENTS

| | | | | |
|---|---|---|---|---|
| 2008/0312828 A1* | 12/2008 | Marsalka | ........... | G01C 21/3608 |
| | | | | 701/431 |
| 2009/0037287 A1* | 2/2009 | Baitalmal | ............. | G06F 21/128 |
| | | | | 705/27.1 |
| 2010/0299455 A1* | 11/2010 | Master | .............. | H04W 52/0216 |
| | | | | 709/248 |
| 2011/0231832 A1* | 9/2011 | Dorn | ......................... | G06F 8/65 |
| | | | | 717/170 |
| 2011/0314534 A1* | 12/2011 | James | ..................... | G06F 21/53 |
| | | | | 726/9 |
| 2012/0149342 A1* | 6/2012 | Cohen | ................... | H04L 51/224 |
| | | | | 455/412.2 |
| 2014/0173674 A1* | 6/2014 | Wolman | ............. | H04N 21/6181 |
| | | | | 725/116 |
| 2020/0356220 A1* | 11/2020 | Biesemann | ........... | G06F 3/0482 |

FOREIGN PATENT DOCUMENTS

| | | |
|---|---|---|
| KR | 10-1292422 B1 | 8/2013 |
| KR | 10-2014-0099040 A | 8/2014 |
| KR | 10-2018-0039980 A | 4/2018 |

\* cited by examiner

MOBILE TERMINAL THAT EXECUTES APPLICATION LOCALLY WHEN DISCONNECTED FROM CLOUD SERVER

CROSS REFERENCE TO RELATED APPLICATIONS

This Application is the National Stage filing under 35 U.S.C. 371 of International Application No. PCT/KR2020/001972, filed on Feb. 12, 2020, the entire contents of which are hereby expressly incorporated by reference into the present application.

TECHNICAL FIELD

The present disclosure relates to a mobile terminal, and is applicable to a technology field of controlling a wider display in a divided manner.

BACKGROUND ART

A terminal may be divided into a mobile terminal (portable terminal) and a stationary terminal depending on whether the terminal is movable. Again, the mobile terminal may be divided into a handheld terminal and a vehicle mounted terminal depending on whether the mobile terminal is able to be directly carried by a user.

A display device is a device with a function of receiving, processing, and displaying an image that the user may watch. For example, the display device receives a broadcast selected by the user among broadcast signals transmitted from a broadcasting station, separates an image signal from the received signal, and displays the separated image signal on a display again.

Recently, as a broadcasting technology and a network technology develop, the functions of the display device have been diversified, and a performance of the device has been improved accordingly. That is, the display device has been developed to provide the user with various other contents as well as contents that are simply broadcasted. For example, the display device may provide not only a program received from the broadcasting station but also game play, music listening, Internet shopping, user customized information, and the like using various applications. In order to perform such extended functions, the display device may be basically connected to other devices or networks using various communication protocols, and may provide the user with a ubiquitous computing environment. That is, the display device has evolved into a smart device that enables connectivity to the network and the ubiquitous computing.

Recently, with a development of a communication service, production and distribution of mobile terminals using a cloud service are increasing. The mobile terminal using the cloud service is one usage example of cloud computing where computing becomes a public good such as electricity or water and is used jointly.

Specifically, the cloud computing, which is a mixture of various computing concepts and communication technologies such as virtualized computing, utility computing, and on-demand computing, refers to a technology of providing various software, security solutions, computing power, and the like in an on-demand manner as a single virtual computer or service is implemented by integrating a plurality of data sensors, which are typically composed of a plurality of computers, with a virtualization technology, and the user accesses the single virtual computer or service.

That is, the cloud computing is an on-demand outsourcing service of IT resources through the Internet, and a scheme of storing a program or a document that was individually stored on a personal computer or a corporate server in an Internet-based virtual server or storage, and allowing the user to perform a desired operation by driving a cloud application such as a web browser or the like using various terminals including the personal computer.

DISCLOSURE

Technical Problem

The present disclosure aims to solve an interruption problem that occurs when connection to a cloud server is not possible in a mobile terminal that streams screen information of an application executed on a cloud server.

Technical Solutions

In order to achieve the above purpose, a mobile terminal according to one embodiment includes a communication device for communicating with a cloud server, a display for outputting an execution screen of an application, a local memory for storing data, and a processor that controls the communication device, the display, and the local memory, and the processor synchronizes data of the application executed on the cloud server and store the synchronized data in the local memory when being connected to the cloud server, and continuously executes the application locally using the synchronized data of the application when being disconnected from the cloud server.

In addition, according to one embodiment, the data of the application includes context data of the application and app data of the application.

In addition, according to one embodiment, the processor streams and outputs the execution screen of the application executed on the cloud server when being connected to the cloud server.

In addition, according to one embodiment, the processor outputs the execution screen of the application using the synchronized data of the application when being connected to the cloud server.

In addition, according to one embodiment, when the application is being executed locally during the disconnection from the cloud server, the processor applies the synchronized data of the application to the application being executed, and when the application is not being executed locally during the disconnection from the cloud server, the processor executes the application by applying the synchronized data of the application.

In addition, according to one embodiment, the processor stores data of the application executed locally during the disconnection from the cloud server in the local memory.

In addition, according to one embodiment, the processor synchronizes the data of the application stored in the memory to the cloud server when being connected to the cloud server again.

In addition, according to one embodiment, the processor connects to the cloud server again, and then, synchronizes data of the application continuously executed on the cloud server and store synchronized data in the local memory.

In addition, according to one embodiment, when the application is being executed on the cloud server at a time when being connected to the cloud server again, the processor applies the synchronized data of the application to the application being executed, and when the application is not being executed on the cloud server at the time when being connected to the cloud server again, the processor continuously executes the application by applying the synchronized data of the application.

In addition, according to one embodiment, when versions of the synchronized application are different in the local and the cloud server, the processor updates both to the latest version.

In addition, according to one embodiment, the display outputs a first interface for selecting an application to be synchronized from the cloud in response to a setting command of the processor.

In addition, according to one embodiment, the display outputs a second interface for setting a synchronization priority in response to a setting command of the processor.

In addition, according to one embodiment, the display outputs a third interface for setting a synchronization time interval in response to a setting command of the processor.

Advantageous Effects

Based on the above purpose, the mobile terminal according to an embodiment may output the continuous screen information even when the connection is cut off while streaming the screen information of the application executed on the cloud server.

In addition, when being connected to the cloud server again, the mobile terminal according to an embodiment may stream the screen information on the cloud server continuously from a time point at which the mobile terminal is connected to the cloud server.

BEST MODE

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element may be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
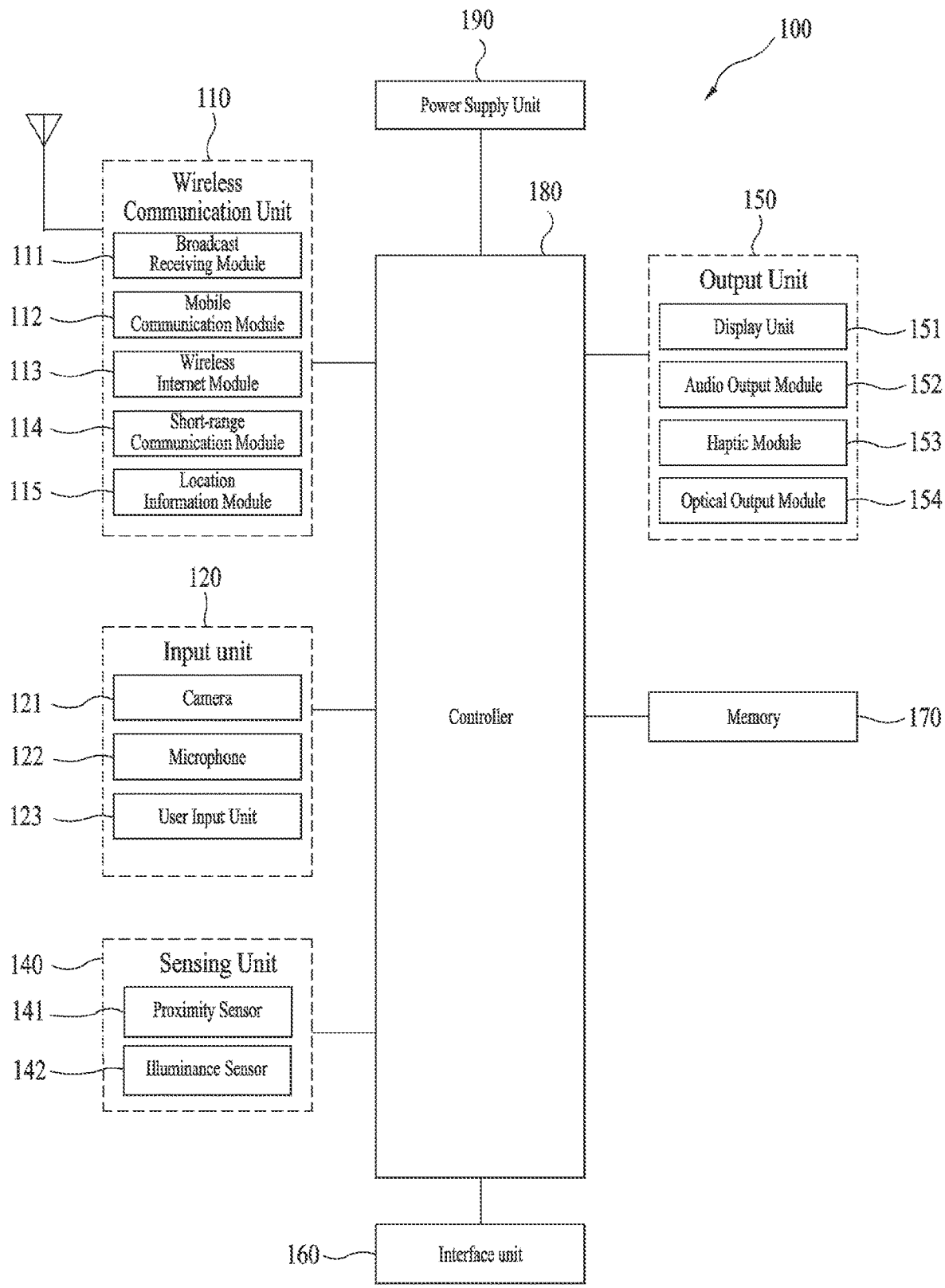
FIG. 1 is a block diagram of a mobile terminal in accordance with the present disclosure.

FIG. 1 is a block diagram of a mobile terminal in accordance with the present disclosure.

The mobile terminal 100 is shown having components such as a wireless communication unit 110, an input unit 120, a sensing unit 140, an output unit 150, an interface unit 160, a memory 170, a controller 180, and a power supply unit 190. Referring now to FIG. 1, the mobile terminal 100 is shown having wireless communication unit 110 configured with several commonly implemented components. It is understood that implementing all of the illustrated components is not a requirement, and that greater or fewer components may alternatively be implemented.

More specifically, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 may transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include Bluetooth™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless Universal Serial Bus (USB), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal may be acquired based on information related to a wireless access point (AP) which transmits or receives a wireless signal to or from the Wi-Fi module.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

Such cameras 121 may process image frames of still pictures or video obtained by image sensors in a video or image capture mode. The processed image frames may be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input may be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is typically implemented using one or more sensors configured to sense internal information of the mobile terminal, the surrounding environment of the mobile terminal, user information, and the like. For example, the sensing unit 140 may alternatively or additionally include other types of sensors or devices, such as a proximity sensor 141 and an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 may provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 may be configured to generate various tactile effects that a user feels, perceive, or otherwise experience. A typical example of a tactile effect generated by the haptic module 153 is vibration. The strength, pattern and the like of the vibration generated by the haptic module 153 may be controlled by user selection or setting by the controller. For example, the haptic module 153 may output different vibrations in a combining manner or a sequential manner.

An optical output module 154 may output a signal for indicating an event generation using light of a light source. Examples of events generated in the mobile terminal 100 may include message reception, call signal reception, a missed call, an alarm, a schedule notice, an email reception, information reception through an application, and the like.

The interface unit 160 serves as an interface with various types of external devices that may be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output, or activating application programs stored in the memory 170.

To drive the application programs stored in the memory 170, the controller 180 may be implemented to control a predetermined number of the components mentioned above in reference with FIG. 1. Moreover, the controller 180 may be implemented to combinedly operate two or more of the components provided in the mobile terminal 100 to drive the application programs.

The power supply unit 190 may be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Some or more of the components may be operated cooperatively to embody an operation, control or a control method of the mobile terminal in accordance with embodiments of the present disclosure. Also, the operation, control or control method of the mobile terminal may be realized on the mobile terminal by driving of one or more application problems stored in the memory 170.

Figure 2:
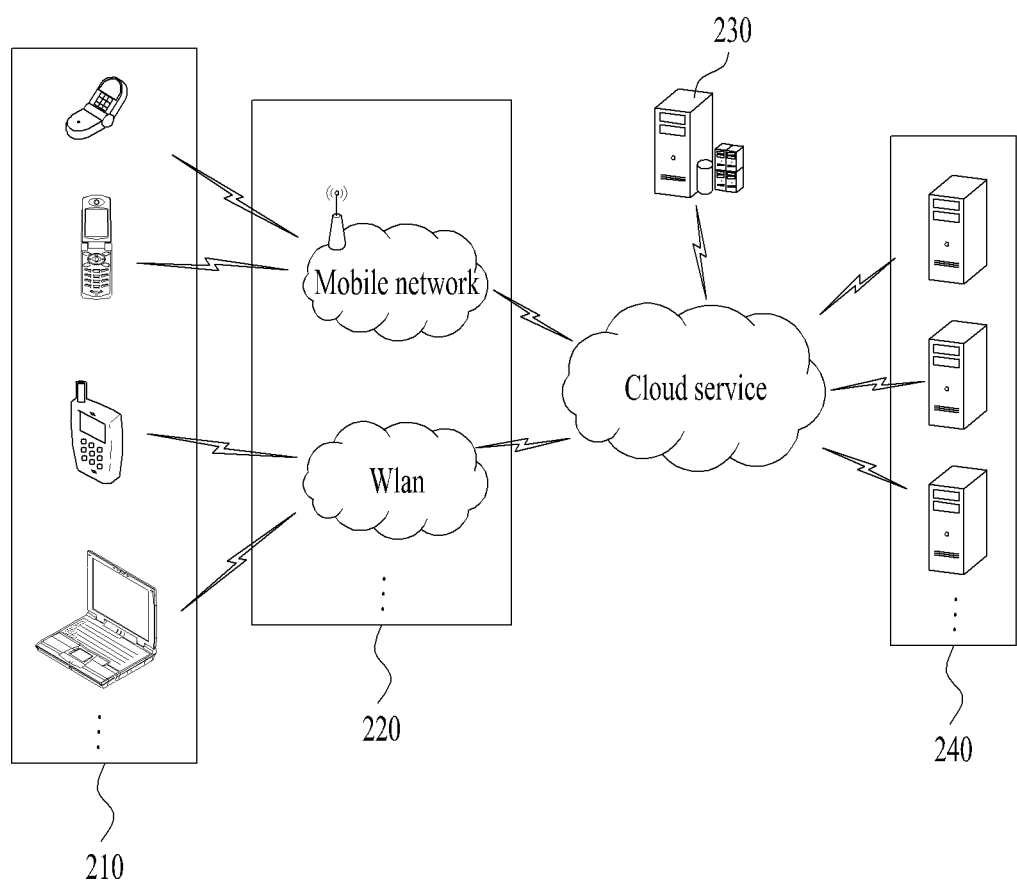
FIG. 2 is a block diagram showing a system that provides a cloud service according to an embodiment.

FIG. 2 is a block diagram showing a system that provides a cloud service according to an embodiment.

Referring to FIG. 2, a cloud service providing system according to one embodiment may include a mobile terminal 210, a wireless communication network 220, a terminal information server 230, and a cloud server 240.

The mobile terminal 210 may connect to the cloud server 240 through the wireless communication network 220 to receive an application, storage, an operating system, a security function, and the like necessary for providing the cloud service.

In this connection, any type of electronic device capable of performing data communication through the wireless communication network 220 such as a mobile phone, a smart phone, a laptop computer, a navigation system, a PMP, and the like may be applied to the mobile terminal 210.

The wireless communication network 220 may be a wireless LAN network, a mobile communication network, and the like, and may provide a network environment corresponding to the type of the mobile terminal 210.

The terminal information server 230 stores and manages terminal information for a plurality of mobile terminals. In addition, in response to a request of the cloud server 240, the terminal information server 230 may obtain detailed terminal information of a corresponding mobile terminal and provide the detailed terminal information to the cloud server 240.

The cloud server 240 may be a server cluster and a plurality of virtualized servers. In addition, when the connection of the mobile terminal 210 that is to provide the cloud service to a user is sensed, the cloud server 240 obtains the detailed terminal information on the corresponding mobile terminal 210 through the terminal information server 230 to identify a service providing method and an interface method suitable for the corresponding mobile terminal 210. In addition, a cloud service suitable for the mobile terminal 210 may be provided with reference to the identified service providing method and interface method.

Figure 3:
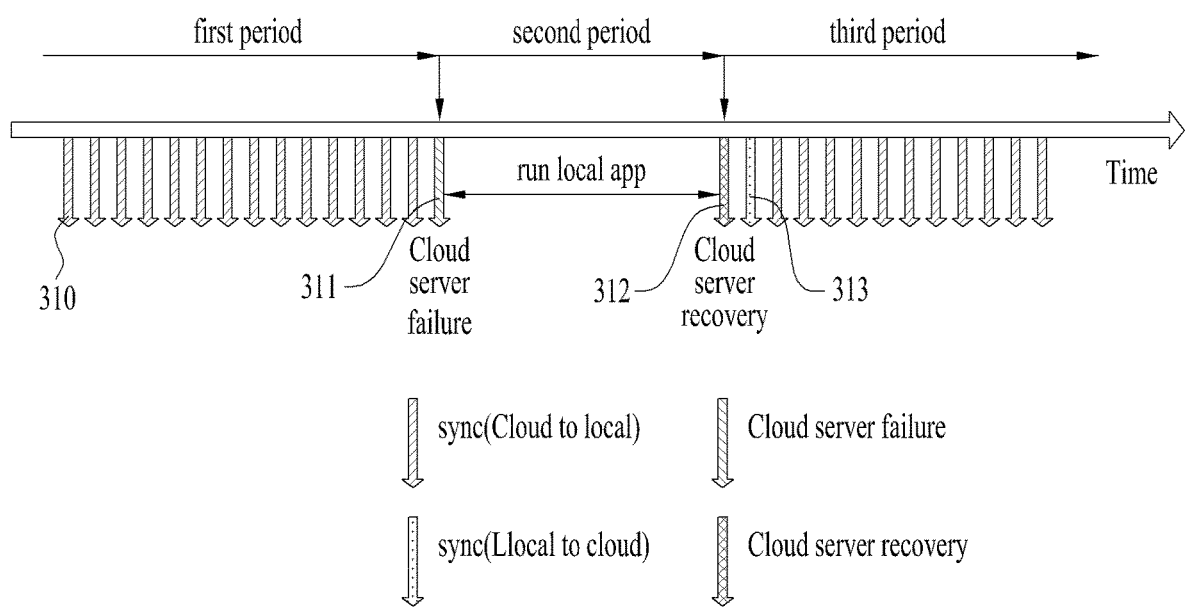
FIG. 3 is a conceptual diagram for illustrating a processor that provides, without interruption, an application executed on a cloud server by a mobile terminal according to an embodiment.

FIG. 3 is a conceptual diagram for illustrating a processor that provides, without interruption, an application executed on a cloud server by a mobile terminal according to an embodiment. Herein, a horizontal axis represents time, and an arrow 310 represents synchronization between the mobile terminal and the cloud server.

The mobile terminal according to one embodiment may include a communication device that communicates with the cloud server, a display that outputs screen information of the application, a local memory that stores data, and a processor that controls the components described above.

When the mobile terminal is connected to the cloud server, the application may be executed in the cloud. In this connection, data of the application executed on the cloud server may be synchronized and stored in the local memory of the mobile terminal.

The data of the application may include context data of the application and app data of the application. Specifically, the context data of the application may include data for composing an execution screen of the application, data obtained by recording the processor of the application, and various object information related to the processor of the application. The app data may include data required to implement the application in a specific OS, data input into the application, or data created through the application.

When the mobile terminal is connected to the cloud server, the mobile terminal may stream the execution screen of the application executed on the cloud server and output the execution screen through the display. Alternatively, when the mobile terminal is connected to the cloud server, the mobile terminal may output the execution screen of the application through the display using the application data.

When the mobile terminal remains connected to the cloud server, the execution screen of the application executed on the cloud server may be output without interruption. However, when the mobile terminal is disconnected from the cloud server or the connection with the cloud server of the mobile terminal is unstable, an output of the execution screen of the application executed on the cloud server may be interrupted or the execution screen may be continuously output in an unstable manner.

In order to solve the above problems that may occur when the application is executed on the cloud server, the mobile terminal according to one embodiment may use the data of the application synchronized and stored in the local memory. Specifically, when the mobile terminal is disconnected from the cloud server, the mobile terminal may continuously execute the application locally using the synchronized data of the application. Specifically, the mobile terminal may execute the application following an execution state of the application at a time point at which the local connection to the cloud server is cut off. In this connection, the execution of the application on the cloud server may be stopped or terminated.

When the mobile terminal is disconnected from the cloud server, the mobile terminal may execute the application locally and store the application data in the local memory. When the mobile terminal is connected to the cloud server again, the mobile terminal may synchronize the data of the application stored in the local memory with the cloud server. The cloud server may continuously execute the application by reflecting execution contents during a disconnected time. In this connection, the local execution of the application may be stopped or terminated.

In FIG. 3, a first period may correspond to a period during which the mobile terminal is connected to the cloud server. The second period, which is a period continuous to the first period, may correspond to a period during which the mobile terminal is disconnected from the cloud server. A third period, which is a period continuous to the second period, may correspond to a period during which the mobile terminal is connected to the cloud server again.

In the first period, the mobile terminal may receive corresponding data of the application from the cloud server at each synchronization time point and store the data in the local memory. In this connection, the data stored in the local memory may be deleted, updated, or accumulated after being stored for a short period of time. The first period may correspond to a period during which the application is executed on the cloud server. In this connection, local execution of the corresponding application may be stopped or terminated.

The mobile terminal may recognize that synchronization with the cloud server has failed 311 at a boundary time point from the first period to the second period. When recognizing that the synchronization with the cloud server has failed 311, the mobile terminal may compose corresponding screen information from a time point at which the synchronization fails 311 using data of the application received during the first period. That is, during the second period, the mobile terminal may execute the application using the data stored in the local memory, and apply an execution history up to the time point at which the synchronization fails 311 to compose a screen at the time point at which the synchronization fails 311.

During the second period, the application may be executed using the data stored in the local memory, and an execution history during the second period may be stored in the local memory. That is, during the second period, the application may be executed locally, not on the cloud server.

The mobile terminal may recognize that the connection has been restored 312 through a signal received from the cloud server at a boundary point from the second period to the third period. When recognizing that the connection with the cloud server has been restored 312, the mobile terminal may synchronize 313 the execution history during the second period from the mobile terminal to the cloud server. During the third period, the cloud server may apply the execution history during the second period to the application executed through the data received from the mobile terminal, and compose a screen at a time point of transition from the second period to the third period.

During the third period, the mobile terminal may receive and output the screen information of the application executed on the cloud server at each synchronization time point. In this connection, the application may be executed on the cloud server and the local execution of the application may be stopped or terminated.

Briefly, during the first period, the application may be executed on the cloud server, and the mobile terminal may stream and provide the screen information of the application at each synchronization time point. During the second period, the application may be executed on the mobile terminal to output the screen information continuously from the first period. During the third period, the application may be executed again on the cloud server, and the mobile terminal may stream and provides the screen information of the application at each synchronization time point, continuously from the second period.

Figure 4:
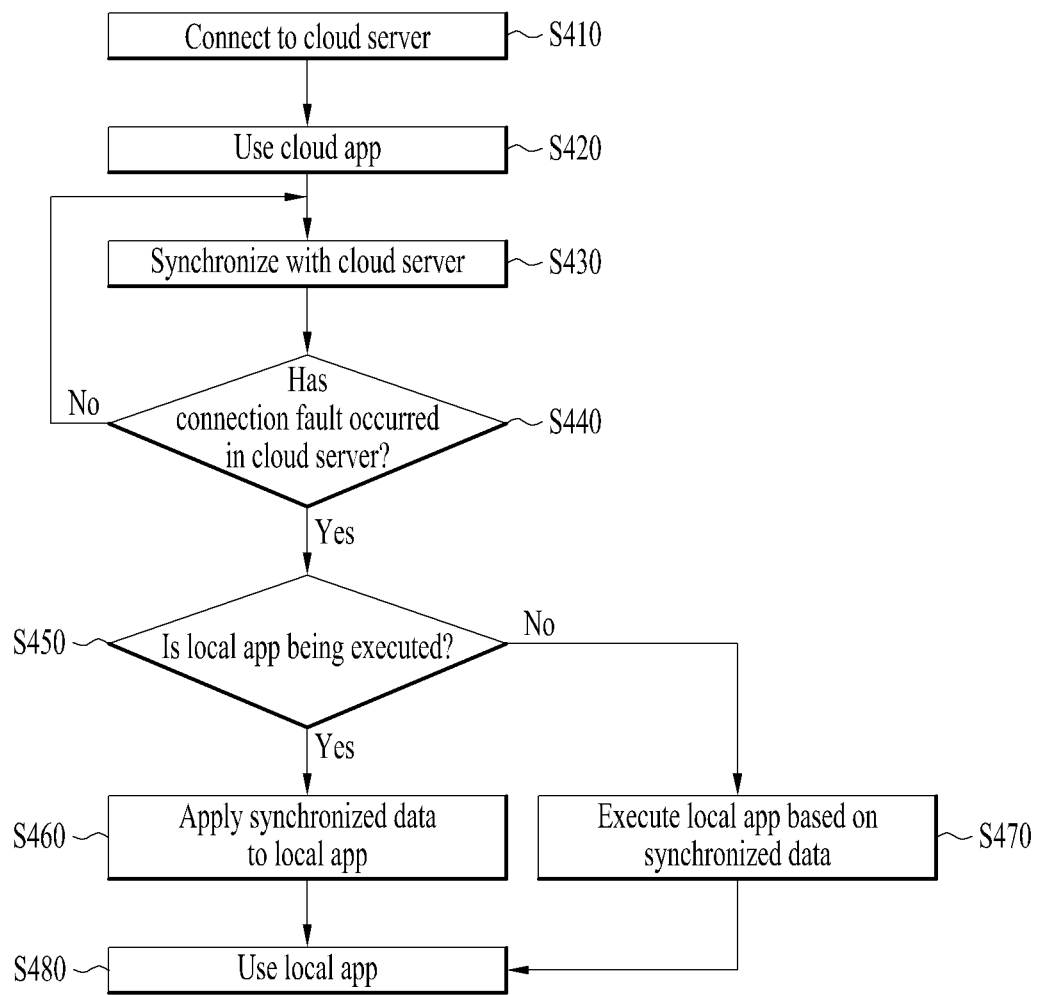
FIG. 4 is a flowchart for illustrating a processor in a case in which a fault in connection has occurred while an application is executed on a cloud server.

FIG. 4 is a flowchart for illustrating a processor in a case in which a fault in connection has occurred while an application is executed on a cloud server. FIG. 4 is a detailed description of a process during transition from the first period to the second period in FIG. 3.

The mobile terminal may connect to the cloud server when the connection to the cloud server is possible (S410). The mobile terminal may connect to the cloud server through wireless Internet. The mobile terminal may connect to the cloud server automatically or in response to a connection command from the user when it is possible to connect to the cloud server.

When the mobile terminal connects to the cloud server, the user may use the application executed on the cloud server through the mobile terminal (S420). The application executed on the cloud server may be referred to as a cloud app. The cloud app may be used as the mobile terminal transfers an input signal received from the user to the cloud server.

The mobile terminal may be synchronized with the cloud server (S430). The synchronization may be performed at a preset time interval. Specifically, the mobile terminal may synchronize the data of the application executed on the cloud server and store the data in the local memory included in the mobile terminal. In this connection, the application data may include the context data and the app data of the application. Specifically, the context data of the application may include processor data corresponding to use of the cloud app, screen composition data (a screen stack), and the various object information related to the processor. In addition, the app data of the application may include data input or created in response to the use of the cloud app.

The mobile terminal may determine that the connection fault has occurred in the cloud server during the synchronization process (S440). When the connection fault has not occurred in the cloud server (S440, No), the mobile terminal may continue the synchronization with the cloud server at the preset time interval. When the connection fault has occurred in the cloud server (S440, Yes), the mobile terminal may determine whether a local app is being executed (S450).

The determining of whether the local app is being executed (S450) may be an operation of determining whether an application corresponding to the application that was being executed on the cloud server is being executed locally. For example, when the connection fault has occurred while using an internet application on the cloud server, it may be determined whether the same Internet application is being executed locally. In this connection, the application executed locally may be in a stopped state.

When the local app is being executed (S450, Yes), the mobile terminal may continuously execute the local app by applying the synchronized data of the application to the local application being executed. Specifically, when the application is being executed locally at the time at which the mobile terminal is disconnected from the cloud server, the synchronized data of the application may be applied to the application that is being executed. In this connection, the synchronized data of the application may be stored in the local memory by being synchronized immediately before the disconnection. When the local app is not being executed (S450, No), the mobile terminal may execute the local app based on the synchronized data (S470). Specifically, when the application is not being executed locally at the time at which the mobile terminal is disconnected from the cloud server, the application may be executed by applying the synchronized data of the application. In this connection, the synchronized data of the application may be stored in the local memory by being synchronized immediately before the disconnection.

In other words, the mobile terminal may locally execute the application corresponding to the application that was being executed on the cloud server continuously from a time point at which the connection to the cloud server becomes impossible. Thereafter, the user may continuously use the application that is executed locally from the time point at which the connection to the cloud server becomes impossible (S480).

Figure 5:
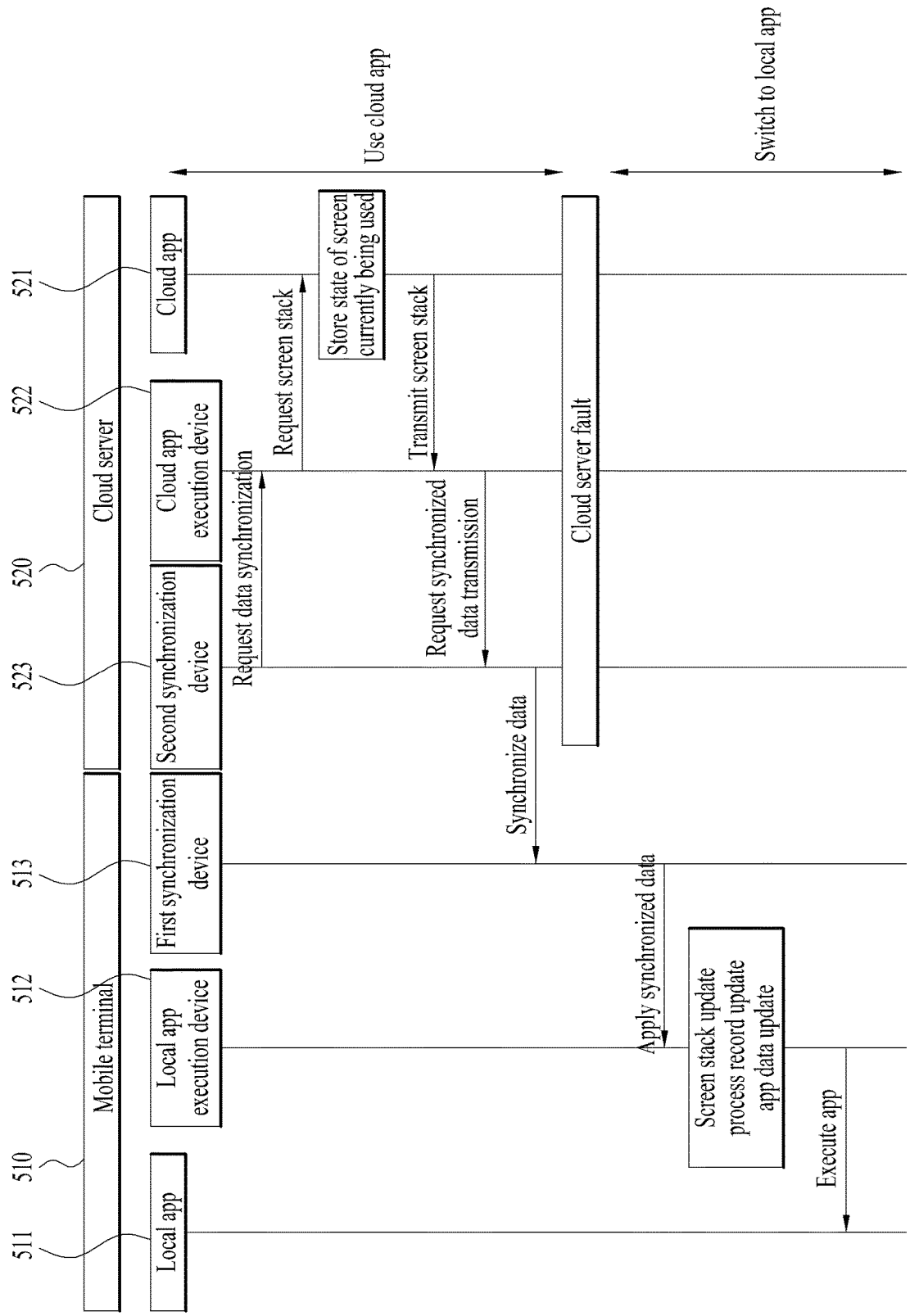
FIG. 5 shows a signal flow between a mobile terminal and a cloud server in relation to FIG. 4.

FIG. 5 shows a signal flow between a mobile terminal and a cloud server in relation to FIG. 4.

The mobile terminal 510 may include a local app 511, which is an application that is executed locally, a local app execution device 512 that executes the local app 511, and a first synchronization device 513 that is responsible for the synchronization with a cloud server 520.

The cloud server 520 may include a cloud app 521, which is an application that is executed on the cloud server, a cloud app execution device 522 that executes the cloud app 521, and a second synchronization device 523 that is responsible for the synchronization with the mobile terminal 510.

The mobile terminal 510 may use the cloud app when connection to the cloud server 520 is possible. While using the cloud app, the cloud app execution device 522 may make a request for the screen stack to the cloud app 521 when receiving a data synchronization request from the second synchronization device 523. The cloud app 521 may store a state of a screen that is currently being used in response to the screen stack request. The cloud app execution device 522 may receive the screen stack from the cloud app 521, and request the second synchronization device 523 to transmit synchronization data including the screen stack. In this connection, the second synchronization device 523 may synchronize the data by transmitting the synchronization data to the first synchronization device 513.

When the mobile terminal 510 is not able to connect to the cloud server 520, the application used may be changed from the cloud app to the local app. While changing the application used to the local app, the local app execution device 512 may apply the synchronization data received from the first synchronization device 513. In this connection, the local app execution device may update the screen stack, update a process record, and update the app data. The local app execution device may execute the local app 511 by applying the synchronized data. In this connection, the local app to be executed may be executed continuously with the cloud app 521 that was being executed before the connection fault occurs on the cloud server.

Figure 6:
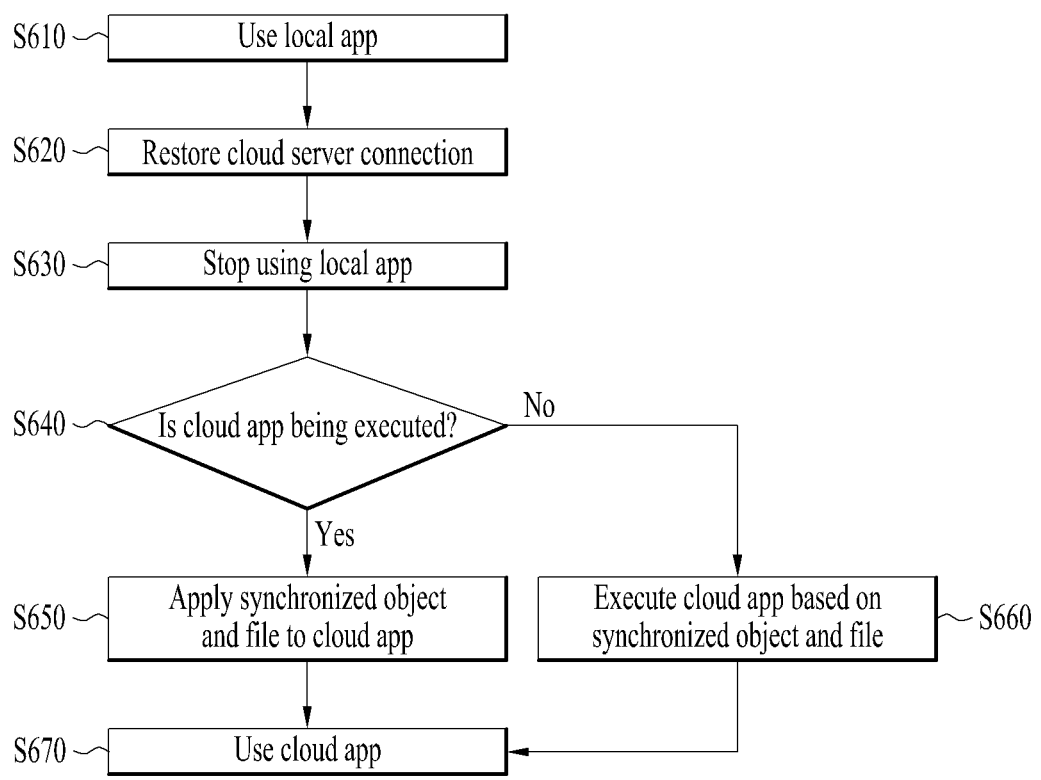
FIG. 6 is a flowchart illustrating a processor in a case in which connection is restored while an application is executed locally.
Figure 7:
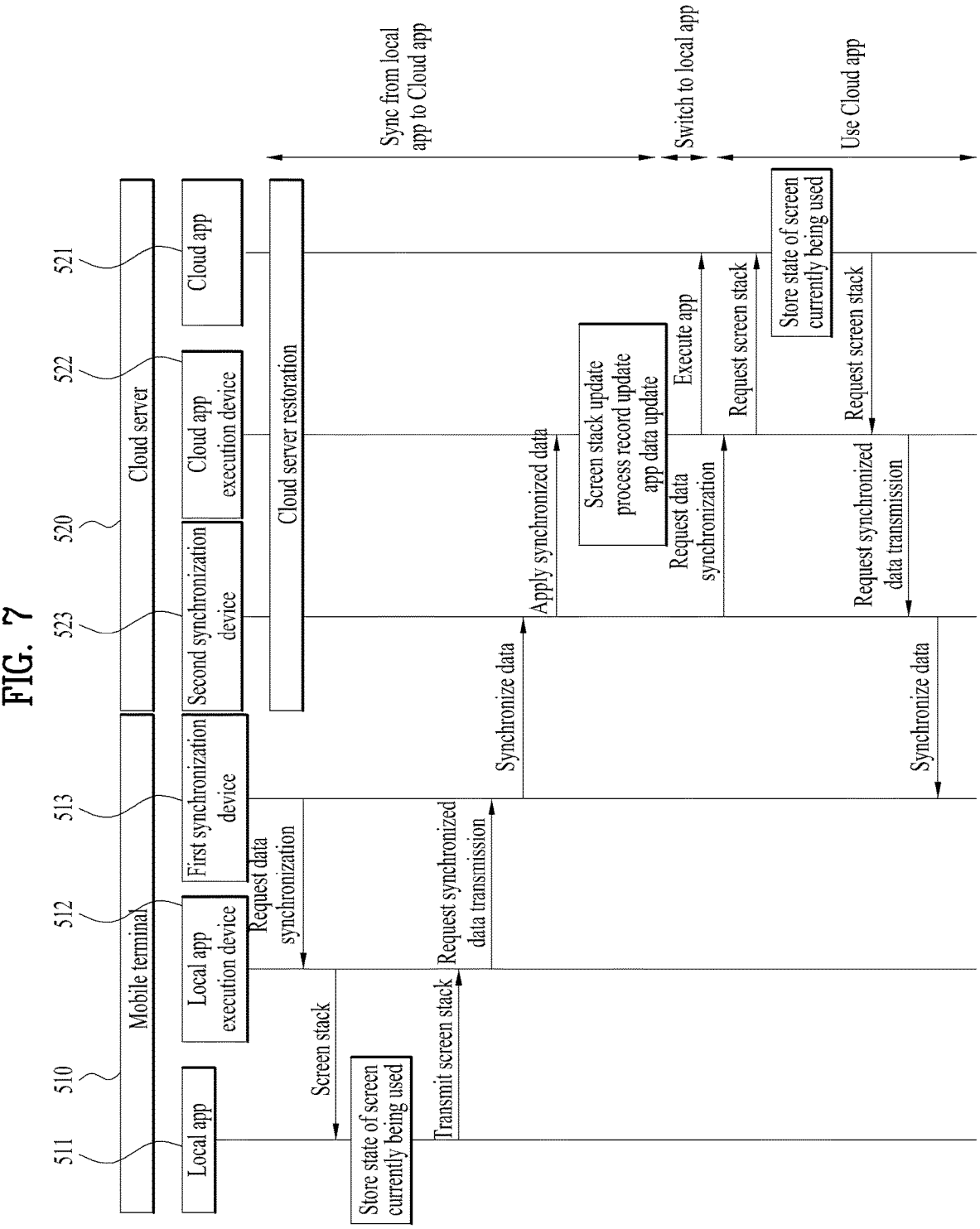
FIG. 7 shows a signal flow between a mobile terminal and a cloud server in relation to FIG. 6.

FIG. 6 is a flowchart illustrating a processor in a case in which connection is restored while an application is executed locally. FIG. 6 is a detailed description of a process during transition from the second period to the third period in FIG. 3. FIG. 7 shows a signal flow between a mobile terminal and a cloud server in relation to FIG. 6.

When the mobile terminal is not able to connect to the cloud server, the local app may be used (S610). In this connection, the use of the local app may correspond to the use of the application executed using the data of the application stored in the local memory. The local memory may store data of the application obtained while using the local app therein.

When restoring the connection to the cloud server (S620), the mobile terminal may stop using the local app (S630). In this connection, the stopping may mean ceasing or terminating. The mobile terminal may synchronize the data of the application stored in the local memory to the cloud server while stopping the use of the local app. In this connection, the data of the application synchronized to the cloud server may be data corresponding to a period during which the connection to the cloud server is cut off.

After stopping the use of the local app, the mobile terminal may determine whether the cloud app is being executed (S640). When the cloud app is being executed (S640, Yes), the mobile terminal may apply the synchronized data of the application to the cloud app (S650). Specifically, the mobile terminal may apply the synchronized data of the application to the application that is being executed in the case in which the application is being executed on the cloud server when the mobile terminal connects to the cloud server again. In this connection, the synchronized data of the application may correspond to the data stored in the local memory during the disconnection. When the cloud app is not being executed (S640. No), the mobile terminal may execute the cloud app by applying the synchronized data of the application (S660). Specifically, the mobile terminal may execute the application by applying the synchronized data of the application in the case in which the application is not being executed on the cloud server when the mobile terminal connects to the cloud server again. In this connection, the synchronized data of the application may correspond to the data stored in the local memory during the disconnection.

That is, the mobile terminal may execute, on the cloud server, the application corresponding to the application that was being locally executed continuously from the time point at which the connection to the cloud server becomes possible. Thereafter, the user may continuously use the application that is executed on the cloud server from the time point at which the connection to the cloud server becomes possible (S670).

Figure 8:
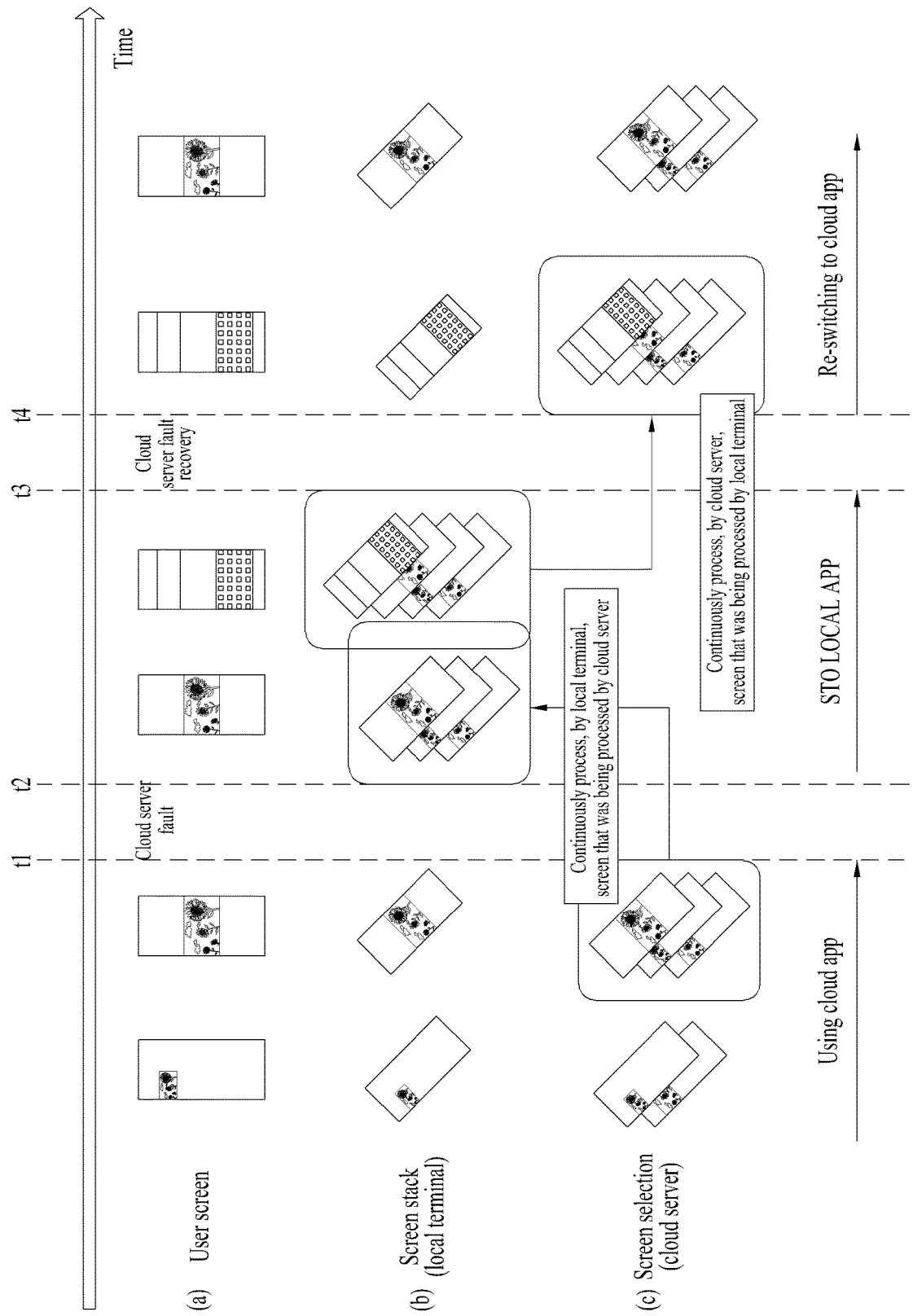
FIG. 8 is a conceptual diagram for illustrating a processor in which an execution screen of an application is continuously provided in response to a fault of connection to a cloud server and a recovery of the connection.

FIG. 8 is a conceptual diagram for illustrating a processor in which an execution screen of an application is continuously provided in response to a fault of connection to a cloud server and a recovery of the connection.

Specifically, in FIG. 8, a horizontal axis may indicate passage of time. Specifically, a first time point t1 may indicate a time point at which the fault of the cloud server occurs while using the cloud app. A second time point t2 may indicate a time point of switching the application to the local app. A third time point t3 may indicate a time point at which the connection to the cloud server is restored. A fourth time point t4 may indicate a time point of switching the application to the cloud app is switched.

Specifically, (a) in FIG. 8 shows a screen (a user screen) output on the display based on passage of time. The screen provided to the user may be continuous even when the use of the cloud app is switched to the use of the local app. Similarly, the screen provided to the user may be continuous even when the use of the local app is switched to the use of the cloud app. That is, the mobile terminal may provide the continuous screen to the user without returning to an initial screen of the application even when the connection to the cloud server is cut off or restored again.

Specifically, (b) in FIG. 8 shows a screen stack processed by the mobile terminal. (c) in FIG. 8 shows a screen stack processed by the cloud server. The mobile terminal may be synchronized with the cloud server at the preset time interval up to the first time point. Until the first time point t1, the mobile terminal is able to only process the latest synchronized screen stack. On the other hand, the cloud server is able to process all screen stacks executed up to the first time point. However, from the second time point t2 to the third time point t3, the cloud server may stop processing the screen stack. In this connection, the mobile terminal may process all screen stacks executed on the local app in succession to all screen stacks synchronized from the cloud server. The mobile terminal may synchronize the screen stack that was processed from the second time point t2 to the third time point t3 with the cloud server between the third time point t3 and the fourth time point t4. The cloud server may continuously process a screen stack after the fourth time point t4. The mobile terminal may be synchronized at the preset time interval after the fourth time point t4, and be able to only process the latest synchronized screen stack.

Figure 9:
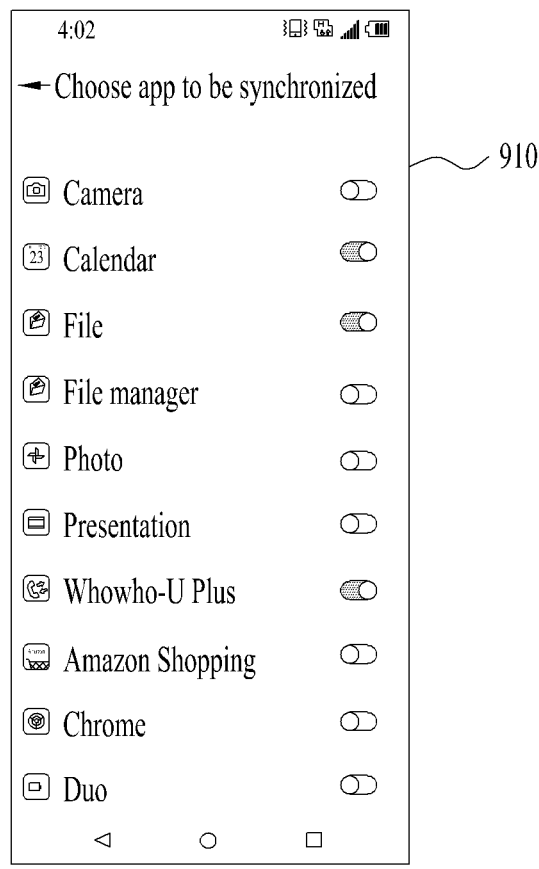
FIG. 9 shows a first interface through which an application to be synchronized may be selected.

FIG. 9 shows a first interface through which an application to be synchronized may be selected.

When being connected to the cloud server, the mobile terminal may output a first interface 910 through which the application to be synchronized may be selected. The first interface 910 may be output in response to a setting command.

The mobile terminal may periodically and locally synchronize only the application selected through the first interface 910. When being disconnected from the cloud server, the mobile terminal may continuously execute the application selected through the first interface 910 using the synchronized data. However, because applications not selected through the first interface 910 are not locally synchronized, the applications not selected through the first interface 910 may be discontinuously executed locally during the disconnection from the cloud server.

In some cases, the mobile terminal may output a second interface (not shown) for determining a priority of the synchronization among the applications selected through the first interface 910. The mobile terminal may sequentially perform the synchronization based on the priority set through the second interface. In this connection, the second interface (not shown) may be output in response to the setting command.

Figure 10:
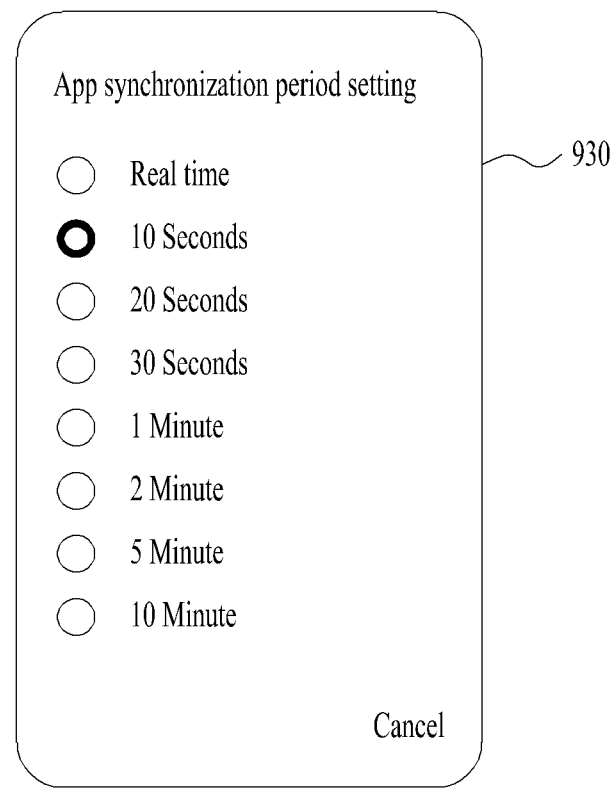
FIG. 10 shows a second interface capable of setting a synchronization period.

FIG. 10 shows a second interface capable of setting a synchronization period.

The mobile terminal may output a third application 930 of setting a synchronization period among the applications selected through the first interface in FIG. 9. The third interface 930 may be output in response to the setting command.

When the synchronization period is short, a load consumed for communication may increase. When the synchronization period is long, the load consumed for the communication may be reduced. Accordingly, the mobile terminal may set the synchronization period for each application.

The above detailed description should not be construed as restrictive in all respects and should be considered as exemplary. The scope of the present disclosure should be determined by a reasonable interpretation of the appended claims, and any changes within the equivalent scope of the present disclosure are included in the scope of the present disclosure.

The invention claimed is:

1. A mobile terminal comprising:
 a communication device configured to communicate with
  a cloud server;

a display configured to output an execution screen of an application being executed in the cloud server;
a local memory configured to store data; and
a processor configured to control the communication device, the display, and the local memory,
wherein the processor is further configured to:
synchronize data of the application executed on the cloud server and store the synchronized data in the local memory when connected to the cloud server;
determine whether a local copy of the application is being executed locally at the mobile terminal when a connection fault occurs between the mobile terminal and the cloud server; and
continuously execute the local copy of the application locally at the mobile terminal using the synchronized data of the application when disconnected from the cloud server in response to determination that the local copy of the application is being executed locally at the mobile terminal when the connection fault occurs between the mobile terminal and the cloud server, or begin to execute the local copy of the application when the local copy of the application was in a stopped state in response to determination that the local copy of the application is not being executed locally at the mobile terminal when the connection fault occurs between the mobile terminal and the cloud sever.

2. The mobile terminal of claim 1, wherein the data of the application includes context data of the application and application data of the application.

3. The mobile terminal of claim 2, wherein the context data of the application include at least one of data for composing an execution screen of the application, data obtained by recording data of the processor of the application, and object information related to the processor of the application, and
wherein the application data of the application include at least one of data required to implement the application in a specific operating system (OS), data input into the application, and data created through the application.

4. The mobile terminal of claim 1, wherein the processor is configured to stream and output the execution screen of the application executed on the cloud server when connected to the cloud server.

5. The mobile terminal of claim 1, wherein the processor is configured to output the execution screen of the application using the synchronized data of the application when connected to the cloud server.

6. The mobile terminal of claim 1, wherein, when the local copy of the application is being executed locally at the mobile terminal during a period of disconnection from the cloud server, the processor is configured to apply the synchronized data of the application to the local copy of application being executed locally at the mobile terminal, and
wherein, when the local copy of the application is not being executed locally at the mobile terminal during the disconnection from the cloud server at the mobile terminal, the processor is configured to execute the application by applying the synchronized data of the application at the cloud server.

7. The mobile terminal of claim 1, wherein the processor is configured to store data of the local copy of the application executed locally at the mobile terminal during a period of disconnection from the cloud server in the local memory.

8. The mobile terminal of claim 7, wherein the processor is configured to synchronize the data of the application stored in the memory to the cloud server when connected to the cloud server again.

9. The mobile terminal of claim 8, wherein the processor is configured to connect to the cloud server again, and then, synchronize data of the application continuously executed on the cloud server and store synchronized data in the local memory.

10. The mobile terminal of claim 1, wherein, when the application is executed on the cloud server at a time when connected to the cloud server again, the processor is configured to apply the synchronized data of the application to the application being executed at the cloud server, and
wherein, when the application is not being executed on the cloud server at the time when connected to the cloud server again, the processor is configured to continuously execute the local copy of application at the mobile terminal by applying the synchronized data of the application.

11. The mobile terminal of claim 1, wherein, when versions of synchronized application are different in the local memory and the cloud server, the processor is configured to update both versions to a latest version of the versions.

12. The mobile terminal of claim 1, wherein the display outputs a first interface for selecting the application to be synchronized from the cloud server in response to a setting command of the processor.

13. The mobile terminal of claim 1, wherein the display outputs a second interface for setting a synchronization priority in response to a setting command of the processor.

14. The mobile terminal of claim 1, wherein the display outputs a third interface for setting a synchronization time interval in response to a setting command of the processor.

15. The mobile terminal of claim 1, wherein the local copy of the application at the mobile terminal is stopped or terminated when the application is executed in the cloud server.

16. The mobile terminal of claim 1, wherein the local copy of the application at the mobile terminal is stopped or terminated both before and after a period of disconnection from the cloud server.

17. A mobile terminal comprising:
a communication device to communicate with a cloud server that executes a cloud application;
a local memory to store data and a local application; and
a processor to control the communication device and the local memory,
wherein the processor is further configured to:
when connected to the cloud server, use the cloud application executed in the cloud server, synchronize data of the cloud application executed on the cloud server, and store the synchronized data in the local memory; and
when disconnected from the cloud server, determine whether the local application is being executed when a connection fault occurs between the mobile terminal and the cloud server, and use the synchronized data to execute the local application to continue to execute an operation that was being performed by the cloud application in response to determination that the local application is being executed locally at the mobile terminal when the connection fault occurs between the mobile terminal and the cloud server or begin to execute the local application to execute the operation that was being performed by the cloud application when the local application was in a stopped state in response to determination that the local application is not being executed locally at the mobile terminal when the connection fault occurs between the mobile terminal and the cloud server.

18. The mobile terminal of claim 17, wherein the processor executes the local application to execute the operation so that the operation is performed without interruption.

19. The mobile terminal of claim 18, wherein the processor is further configured to provide synchronized data to the cloud server when the connection fault ends, so that the cloud application continues to execute the operation without interruption.

20. The mobile terminal of claim 17, wherein the data in the local memory is synchronized at a preset time interval.

21. A method of continually executing an operation between a cloud application of a cloud sever and a local application of a mobile terminal, the method comprising:
   when the mobile terminal is connected to the cloud server, using the cloud application executed in the cloud server, synchronizing data of the cloud application executed on the cloud server, and storing the synchronized data in a local memory of the mobile terminal; and
   when the mobile terminal is disconnected from the cloud server, determining whether the local application is being executed when a connection fault occurs between the mobile terminal and the cloud server, and using the synchronized data to execute the local application to continue to execute the operation that was being performed by the cloud application in response to determination that the local application is being executed locally at the mobile terminal when the connection fault occurs between the mobile terminal and the cloud server or using the synchronized data to begin to execute the local application to execute the operation that was being performed by the cloud application when the local application was in a stopped state in response to determination that the local application is not being executed locally at the mobile terminal when the connection fault occurs between the mobile terminal and the cloud server.

22. The method of claim 21, further comprising:
   executing the local application to execute the operation so that the operation is performed without interruption; and
   providing the synchronized data to the cloud server when the connection fault ends, so that the cloud application continues to execute the operation without interruption.

* * * * *